Figure 1:
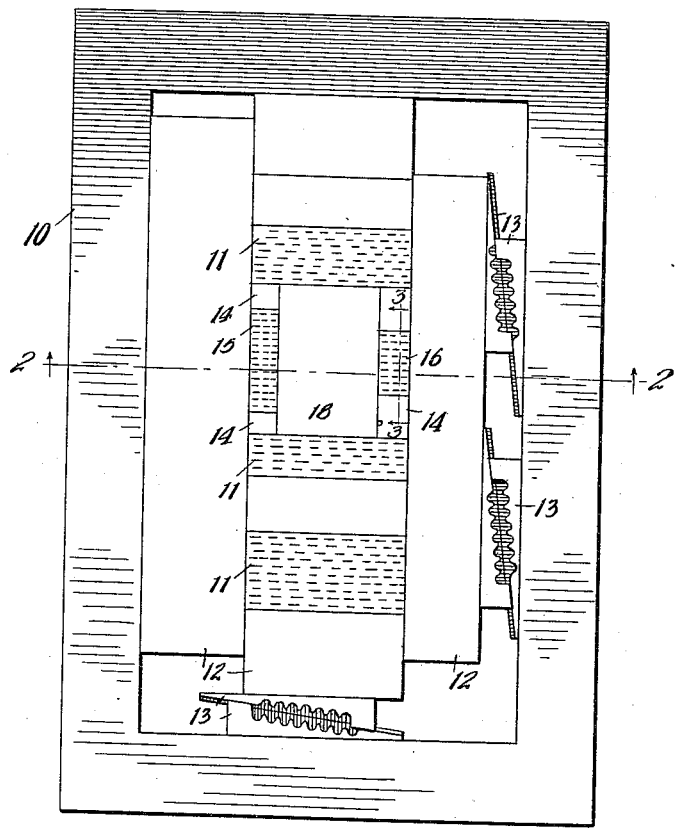

W. F. BARNARD.
APPARATUS FOR TYPE PRINTING.
APPLICATION FILED JAN. 29, 1912.

1,098,367.

Patented June 2, 1914.

2 SHEETS—SHEET 1.

Witnesses:
Wm. Geiger
H. M. Munday

Inventor:
William F. Barnard
By Munday, Evarts, Adcock & Clarke
Attys.

W. F. BARNARD.
APPARATUS FOR TYPE PRINTING.
APPLICATION FILED JAN. 29, 1912.

1,098,367.

Patented June 2, 1914.

2 SHEETS—SHEET 2.

Witnesses:

Inventor:
William F. Barnard
By Munday, Evarts, Adcock & Clarke,
Attys.

UNITED STATES PATENT OFFICE.

WILLIAM F. BARNARD, OF CHICAGO, ILLINOIS.

APPARATUS FOR TYPE-PRINTING.

1,098,367.  Specification of Letters Patent.  Patented June 2, 1914.

Application filed January 29, 1912. Serial No. 674,141.

*To all whom it may concern:*

Be it known that I, WILLIAM F. BARNARD, a citizen of the United States, residing in Chicago, in the county of Cook and State of Illinois, have invented a new and useful Improvement in Apparatus for Type-Printing, of which the following is a specification.

This invention relates to an apparatus for printing a plurality of different impressions from the same type-form without insertion or removal of the type.

It is well known in the printing art that many manufacturers, wholesalers and retailers publish price catalogues every year or oftener, and that it is customary, after the type has been set up for printing the first edition of such catalogues, to keep and store the same until it is required for printing subsequent editions. In order to avoid the setting up of this type more than once, the various articles to be sold are generally given a list price which remains the same year after year, and as the number and description of the articles in the price list or catalogues always remain practically the same, except for the addition of new matter, it is unnecessary to reset the type for each edition or reprint of the catalogue. These catalogues or price lists or similar articles which give the names descriptions and list prices of the various articles are sent to the buyers or trade throughout the country merely to furnish them with sufficient data to order goods. The list price of each article remains constant, but in order to meet the varying conditions of trade and business, different discounts are given from time to time, varying with each separate article, in order to obtain the actual selling price, and as will be obvious, discounts on some articles change often, whereas rates of discount on other articles remain practically constant from year to year.

In order to supply the salesmen of the manufacturer or seller with the constantly varying rates of discounts on the article listed in the catalogue, it has been customary to provide the salesmen with the additional information in regard to these rates in one of two ways. The first method, now practically obsolete, was to print from time to time and supply the salesmen with, separate pamphlets or folders containing the rates of discount on each article as the rates changed, but this method was expensive, inefficient and absolutely impractical, since it required too much time for the salesmen to look up the price list of an article and then refer to a multiplicity of loose pamphlets or folders to find what the rate of discount happened to be at that time on that particular article. The foregoing method of supplying the salesmen with the additional information has been generally succeeded by another, by which the salesmen are supplied with catalogues and price lists similar to those supplied to the trade or buyers, and containing in addition thereto the rates of discounts in code signs displayed adjacent each list price of each article. To print these salesmen's editions of the price lists or catalogues having the discount rates, with type set up along with the other type, as type printing has hitherto been practised, would render the cost of such editions of reprints prohibitive, as it would necessitate a complete re-setting up of the type forms each time a single rate of discount was changed. Instead of doing that, it is now customary to print extra copies of the catalogue or price list as supplied to the buyers and run these through the press and give them a second impression, adding the data in regard to the rates of discounts. This method of printing the catalogues or price lists is expensive and unsatisfactory. It requires the handling or feeding twice of the paper in each catalogue, and as these catalogues or price lists often contain several hundred pages, the cost of labor is therefore materially increased. Furthermore, it is necessary to set up complete forms containing only the discount rates data, and these forms must be re-set each time a change in a discount rate of any article occurs, which, as will be apparent, again adds greatly to the cost. A still greater disadvantage in this method of printing a second or subsequent edition for the salesmen is due to the fact that it is almost impossible to set up the type for the added data in the proper places, and in feeding the sheets to receive the second impression, the sheets become displaced, with the result that the impression caused by the second printing operation is out of register and overlaps the printed matter of the first impression, and the final edition is unsatisfactory for practical use.

The object of my invention is to provide an apparatus for type printing two editions or impressions of price catalogues and similar articles of the class described in the foregoing, and which shall be simple, cheap and practical and at the same time result in the uniform printing of the copies, and which shall be readily adapted to all changes with a minimum of expense and labor.

With the foregoing objects in view, one form of my invention consists essentially, in the case of monotype printing, in employing types of different heights or lengths, whereby the type of shorter dimension may be used at one time to cause an impression by being backed with shims or fillers so as to be level with the other or longer type, and then by removing the shims or fillers, the shorter type may be depressed or caused to disappear (as it may be termed) below the printing level of the longer type, so that the same form of type may be used to cause two impressions of substantially the same printed matter, except that one contains additional data, without the necessity of setting up two sets or forms of type, and without requiring two separate printing operations on the same sheet.

So far as I am aware, type has always been made of uniform height, known as "type-high," which approximates .9166 inch, and which is standard throughout the world. Furthermore, all cuts and plates used in connection with type printing are also made to correspond in height to "type-high" type, so that hitherto it has been impossible to retain the standard type in position in a form without having each one cause an impression, or, stated in other words, it has been impossible to cause any type of standard height or "type-high" to disappear during any printing operation without entirely removing it from the form and thus requiring the entire form to be re-set.

In my improved apparatus described herein, I preferably employ type of a height other than "type-high" in combination with the standard or "type-high" type. When I desire the short type to cause an impression, I back the same with a shim or spacer which brings the type to a level with the type of the standard height. When a type of shorter length is not required, the shim or spacer is removed from the back of the form and the short type disappears, whereby only the type of standard height causes an impression, and the form is not dismantled, and at any later time the short type may be again utilized by replacing the shims or spacers behind the short type.

My invention furthermore consists in the improvements in the parts and devices and in the combinations of parts and devices herein shown, described or claimed.

Figure 2:
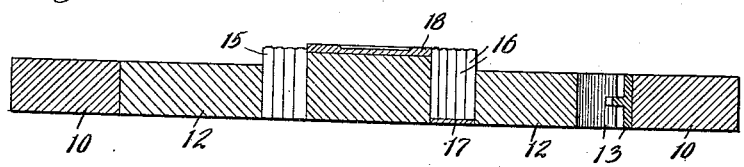
Figure 3:
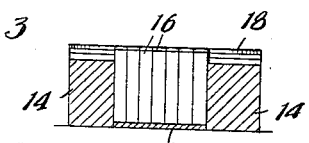
Figure 4:
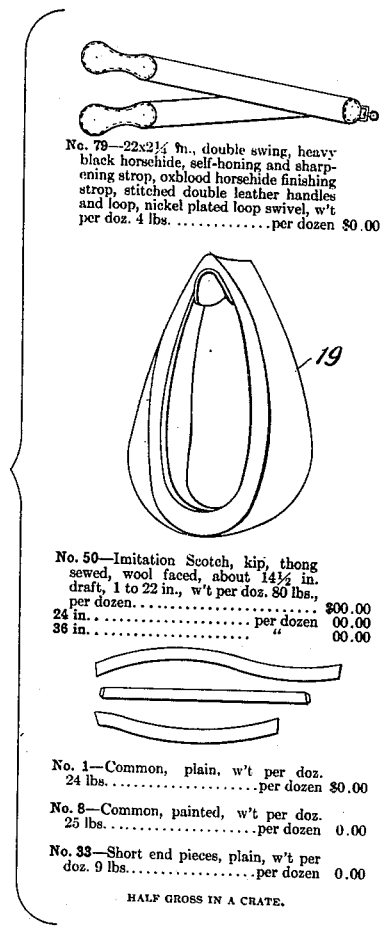

In the drawing forming a part of this specification, Figure 1 is a plan view of a chase showing my improvements in connection therewith. Fig. 2 is a transverse, sectional view of the apparatus shown in Fig. 1, taken on the line 2—2. Fig. 3 is a partial sectional view, taken on the line 3—3 of Fig. 1. Fig. 4 illustrates a specimen impression made in accordance with my new process with the shorter type depressed and Fig. 5 is a view similar to Fig. 4, showing the impression which results when all the type are placed at the same level.

In the drawing, 10 denotes a chase which may be of any well known and suitable construction, and which is adapted to support type 11 which is of the standard or "type-high" heights and retained in place by furniture 12 and quoins 13. The usual leads 14 are also employed to properly fill in the spaces between the type.

15 and 16 denote the shorter type, which in the apparatus illustrated is less than "type-high," the same being adapted to be brought to the same level with the "type-high" type by means of filler blocks or shims 17 adapted to be inserted at the rear of the shorter type.

Figure 5:
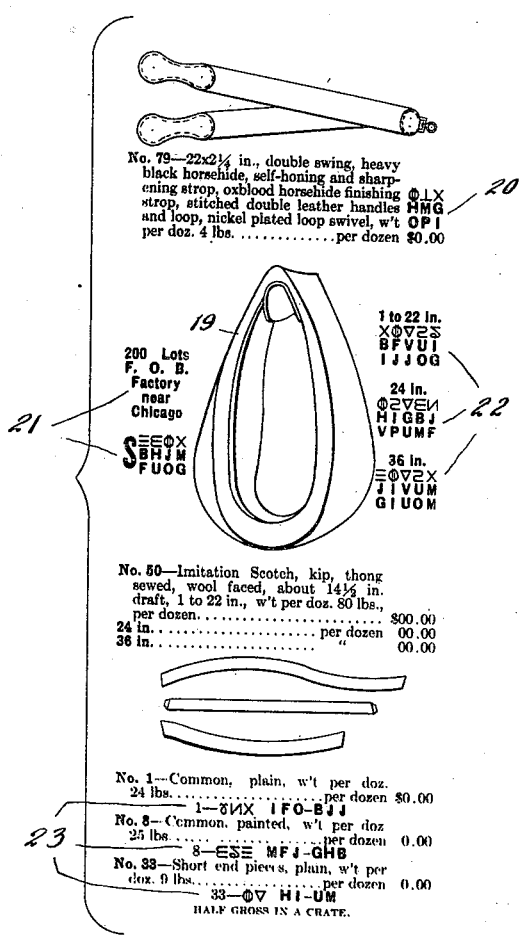

18 denotes the cut which, in the device illustrated, is adapted to produce the figure of the horse collar 19 shown in Figs. 4 and 5. It will be understood that the shorter type and the filler blocks coöperating therewith are adapted to be positioned at any place in the type-form, and as shown in Fig. 5, produce the impressions corresponding to the code signs 20, 21, 22 and 23.

In operation, the type-form is set up with all the type placed at the same level including the "type-high" type and the shorter type so that the impression produced will contain not only all the descriptive matter and list prices of the various articles, but also the rates of discounts for each article in the manner as illustrated in Fig. 5. After a sufficient number of these impressions have been secured, the quoins are loosened and the filler blocks or shims 17 removed from behind the shorter type 16, whereupon the latter are depressed or caused to disappear and the quoins again tightened. Another series of impressions is then taken which will have omitted therefrom the code signs or rates of discounts for the different articles, such an impression being illustrated in Fig. 4. In taking subsequent impressions from this same type-form, it will be understood that the quoins are loosened and such of the shorter type as are required are again brought to the level of the "type-high" type and the filler blocks inserted therebehind and the impression again taken.

In practice, I have also found it desirable to make the length of the short type considerably less than that of the "type-high" type, yet at the same time somewhat longer than the quads, so that, after the short type have been displaced, and it is desired to raise the faces of the short type to the level of those of the "type-high", should any quads accidentally become engaged by the filler block or shim, the face of the quad would not be brought to such a level as to cause an impression. Furthermore, the shims are cut on the point system to any desired size, so that when in place behind the short type, they will occupy an area which is exactly equal to that of the short type and can therefore be easily locked in position by tightening the quoins as are all the type in the form, and without the necessity of glue, wedges or other expedients.

I have described my invention as used in connection with a type-form employing monotype, but it will be understood that the same is merely illustrative, and that all changes and variations are contemplated as fall within the scope of the appended claims.

I claim:—

1. In an apparatus for type-printing a plurality of different impressions from the same type-form, the combination of a chase, a body of type of the same normal height set up therein, shorter type set up therein, means for vertically adjusting the shorter type to the face level of the normal type or to a lower non-printing level, so that the form may be used for printing with the normal type only or with both of the said type, and means for locking the type in the chase with the shorter type at either of said levels, substantially as specified.

2. In an apparatus for type-printing a plurality of different impressions from the same type-form, the combination of a chase, a body of type of the same normal height set up therein, shorter type set up therein, a removable and replaceable filler block for vertically adjusting together the plurality of individual shorter type to the face level of the normal type or to a lower non-printing level, so that the form may be used for printing with the normal type only or with both of the said type, and means for locking the type in the chase with the shorter type at either of said levels, substantially as specified.

3. In an apparatus for type-printing a plurality of impressions from the same type-form, the combination in a type-form, of a plurality of types with removable and replaceable filler blocks for backing certain of the type that are adapted to have their faces set either at or displaced from the level of the faces of the other types in the form, said removable and replaceable filler blocks being formed on the point system, substantially as specified.

4. In an apparatus for type-printing a plurality of different impressions from the same type-form, the combination of a chase; a plurality of different bodies of type set up therein, the several bodies of type comprising coördinated matter which at one time is to be printed at one impression from the form and one of the bodies of type comprising matter which at another time is to be omitted in printing without disturbing the order of the type and without removing the same from the form; removable and replaceable filler blocks whereby the printing faces of the several bodies of type may be relatively adjusted at different levels with the face of such type as are not to make an impression adjusted below the printing level; and means for locking the several bodies of type in the chase before said adjustment and after said adjustment; substantially as specified.

WILLIAM F. BARNARD.

Witnesses:
 PEARL ABRAMS,
 H. M. MUNDAY.

---

Copies of this patent may be obtained for five cents each, by addressing the "Commissioner of Patents, Washington, D. C."